Patented Aug. 12, 1947

2,425,694

UNITED STATES PATENT OFFICE 2,425,694

SULFATOPROPIONAMID AND PREPARATION OF ACRYLIC ACID

Harold S. Davis, Greenwich, Myrl Lichtenwalter, Old Greenwich, and John G. Erickson, Greenwich, Conn., assignors to American Cyanamid Company, New York, N. Y., a corporation of Maine No Drawing. Application May 14, 1945, Serial No. 593,774

13 Claims. (Cl. 260—458)

The present invention relates to a method of preparing acrylic acid.

Heretofore it has been proposed to produce acrylic acid by heating ethylene cyanohydrin with sulfuric acid and water. The direct hydrolysis of the cyanohydrin with aqueous sulfuric acid by this known method is an extremely hazardous procedure. The reaction is difficult to control and the yields of acrylic acid are inconsistent.

It has now been discovered that acrylic acid may be prepared in a simple and convenient manner by reacting ethylene cyanohydrin with anhydrous sulfuric acid to produce β-sulfatopropionamide, adding water thereto, heating the mixture at a temperature sufficient to form acrylic acid and ammonium bisulfate, and distilling the acrylic acid therefrom.

The reactions involved in the preparation of acrylic acid according to the present invention may be outlined as follows:

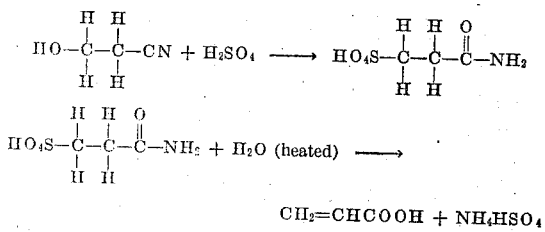

The reaction of ethylene cyanohydrin with anhydrous sulfuric acid produces quantitative yields of β-sulfatopropionamide. This product provides an excellent route to acrylic acid through further hydrolysis and cracking of the hydrolyzed product.

It is remarkable in the present process that ethylene cyanohydrin reacts with anhydrous sulfuric acid to produce β-sulfatopropionamide in substantially quantitative yields. On the contrary, when the sulfuric acid contains substantial quantities of water, its reactivity toward ethylene cyanohydrin is greatly decreased and even after prolonged treatment unchanged ethylene cyanohydrin can be isolated from the overall reaction product.

In carrying out the process, the ethylene cyanohydrin and anhydrous sulfuric acid are mixed together, preferably by slowly adding the cyanohydrin to the acid with good stirring. The temperature of the reaction mixture is not allowed to exceed about 100° C., and is maintained preferably within the range of 40°–90° C. The sulfuric acid may be used in excess of one mol of cyanohydrin to one mol of acid depending on the desired fluidity of the product. Water is then added to the reaction menstruum with stirring to hydrolyze the β-sulfatopropionamide. The resulting mixture is heated until hydrolysis of the amide group is substantially complete, followed by distillation of the product preferably under reduced pressure. Acrylic acid along with water, the latter corresponding approximately to the excess used in the hydrolysis step, distills over and is condensed by cooling.

In the reaction of ethylene cyanohydrin with anhydrous sulfuric acid, it will be seen that one equivalent of free acid disappears as the β-sulfatopropionamide is formed. It has been found that the $SO_4H$ group is not easily hydrolyzed. Accordingly, it is possible to follow the progress of the reaction with time by dissolving weighed samples of the product in water and titrating them with standard alkali. The examples given in Table 1 illustrate the progress of the reaction with time for various molar ratios of acid to cyanohydrin at different temperatures.

Table 1

[Percentage of Ethylene Cyanohydrin Reacted]

| Example | Molar Ratio, Sulfuric Acid to Ethylene Cyanohydrin | Temp., C. | Time is from start of addition of cyanohydrin to acid. Completion of addition required 16–20 minutes | | | | Period when solidification of product appeared, Minutes |
|---|---|---|---|---|---|---|---|
| | | | 20 Min. | 30 Min. | 1 Hour | 2 Hours | |
| | | | Per cent | Per cent | Per cent | Per cent | |
| 1 | 1 | 40 | 62.5 | 63.5 | 65.6 | 67.5 | 150. |
| 2 | 1 | 50 | 68.0 | 72.8 | 77.7 | 84.0 | 45. |
| 3 | 1 | 60 | 67.8 | 69.8 | 81.0 | 84.0 | 40. |
| 4 | 1 | 80 | 77.1 | 85.2 | | | 20. |
| 5 | 1.25 | 60 | 81.2 | 86.1 | 95.6 | 97.0 | 40. |
| 6 | 1.5 | 40 | 81.8 | 83.4 | 86.8 | 91.1 | 120. |
| 7 | 1.5 | 60 | 89.5 | 93.3 | 97.8 | 98.5 | 40. |
| 8 | 1.5 | 80 | 94.8 | 98.3 | | | 23. |
| 9 | 1.75 | 60 | 92.8 | 96.2 | | | Semi-fluid at room temp. |
| 10 | 2 | 40 | 92.6 | 96.1 | 96.4 | 99.3 | Fluid at room temp. for one week. |
| 11 | 2 | 60 | 95.8 | 98.0 | 98.3 | | Fluid at room temp. for one week. |

In the above examples the ethylene cyanohydrin was added slowly to the well-stirred anhydrous sulfuric acid at the specified temperature, the heat of reaction being dissipated to a cooling bath. The addition of the cyanohydrin required from 16 to 20 minutes. The periods given are from the start of the addition of the cyanohydrin. The reaction rate increases with the molar ratio of acid to cyanohydrin and with the temperature. In Example 11 when using a molar ratio of 2, reaction was 95.8% complete at 60° C. by the time all the cyanohydrin had been added to the acid. The reaction products tend to solidify indicating that the $\beta$-sulfatopropionamide is not soluble in all proportions in anhydrous sulfuric acid. This tendency decreases with the molar ratio of acid to cyanohydrin. The solid material which separates from the products is $\beta$-sulfatopropionamide.

A reaction product, made with a molar ratio of 2 (1 ethylene cyanohydrin:2 sulfuric acid), deposited white crystals after standing three weeks. The crystals were removed and thoroughly centrifuged to remove most of the adhering $H_2SO_4$, and a sample analyzed for total nitrogen, sulfur, and acid equivalence. The white crystalline material was then washed several times on a sintered-glass filter funnel with 2-B-ethanol, and dried in a vacuum oven at 50–60° C. for 48 hours. The analytical results on the two samples were as follows:

|  | N | $SO_3$ | Acid Equivalence |
|---|---|---|---|
|  | Per cent | Per cent | Per cent |
| Calculated for $HO_4SCH_2CH_2CONH_2$ | 8.28 | 47.33 | 100 |
| Found in sample thoroughly centrifuged | 7.97 | -------- | 105.5 |
| Found in sample thoroughly centrifuged and alcohol washed | 8.28 | 47.15 | 100.8 |

$\beta$-sulfatopropionamide is a new compound. It shows no sharp melting point but appears to soften at about 110° C. and gradually becomes liquid between 160° and 180° C.

The effect of time at various temperatures of hydrolysis on the yield of acrylic acid is illustrated by the examples in Table 2.

*Table 2*

| Examples | Mols ECH | Mols $H_2SO_4$ | Mols $H_2O$ | Hydrolysis Temperature, °C. | Time of Hydrolysis | Distillation Press., mm. | Per cent Yield Acrylic Acid | Per cent Acrylic Acid in Distillate |
|---|---|---|---|---|---|---|---|---|
| 12 | 1 | 2 | 1 | 120 | 4 hrs | 12–15 | 76 | 89.6 |
| 13 | 1 | 2 | 1 | 120 | 19 hrs | 12–15 | 76.7 | 93.6 |
| 14 | 1 | 2 | 2 | 120 | 4 hrs | 12–15 | 91.6 | 77.1 |
| 15 | 1 | 2 | 2 | 120 | 6 hrs | 12–15 | 92.9 | 75 |
| 16 | 1 | 2 | 2 | 120 | 19 hrs | 12–15 | 87.3 | 76.2 |
| 17 | 1 | 2 | 2 | 100 | 4 hrs | 12–15 | 74.9 | 70.7 |
| 18 | 1 | 2 | 2 | 100 | 6 hrs | 12–15 | 79.6 | 74.5 |
| 19 | 1 | 2 | 2 | 155 | 15 min | 12 | 91.2 | 76.9 |
| 20 | 1 | 2 | 2 | 155 | 10 min | 25 | 90 | 76.5 |
| 21 | 1 | 2 | 2 | 155 | 20 min | 25 | 90.5 | 79.6 |
| 22 | 1 | 2 | 3 | 155 | 10 min | 25 | 91.6 | 68.8 |
| 23 | 1 | 2 | 3 | 155 | 20 min | 20 | 92.3 | 65.1 |
| 24 | 1 | 2 | 3 | 155 | 30 min | 12 | 94.9 | 65.6 |
| 25 | 1 | 2 | 2 | 155 | 15 min | 760 | 71 | 77 |
| 26 | 1 | 2 | 2 | distilled directly |  | 760 | 76 | 82.4 |
| 27 | 1 | 2 | 3 | distilled directly |  | 760 | 84 | 69.8 |

The effect of varying the amount of water used in the hydrolysis step on the yield of acrylic acid is illustrated by the examples listed in Table 3.

*Table 3*

| Examples | Mols ECH | Mols $H_2SO_4$ | Mols $H_2O$ | Hydrolysis Temperature, °C. | Time of Hydrolysis | Distillation Press., mm. | Per cent Yield Acrylic Acid | Per cent Acrylic Acid in Distillate |
|---|---|---|---|---|---|---|---|---|
|  |  |  |  |  | Hours |  |  |  |
| 28 | 1 | 1.75 | 1.5 | 120 | 6 | 12–15 | 81.2 | 83.6 |
| 29 | 1 | 1.75 | 2.0 | 120 | 6 | 12–15 | 90.4 | 76.0 |
| 30 | 1 | 1.75 | 3.0 | 120 | 4 | 12–15 | 93.3 | 65.0 |
| 31 | 1 | 2 | 1 | 120 | 4 | 12–15 | 76.0 | 89.6 |
| 32 | 1 | 2 | 2 | 120 | 4 | 12–15 | 91.6 | 77.1 |
| 33 | 1 | 2 | 3 | 120 | 4 | 12–15 | 93.2 | 65.6 |
| 34 | 1 | 2 | 4 | 120 | 4 | 12–15 | 96.0 | 56.8 |
| 35 | 1 | 2 | 2 | distilled directly |  | 760 | 76 | 82.4 |
| 36 | 1 | 2 | 3 | distilled directly |  | 760 | 84 | 69.8 |
| 37 | 1 | 2 | 4 | distilled directly |  | 760 | 89 | 61.3 |

The examples given in Table 4 show the effect of varying the amount of anhydrous sulfuric acid in the formation of $\beta$-sulfatopropionamide on the yield of acrylic acid.

*Table 4*

| Examples | Mols ECH | Mols $H_2SO_4$ | Mols $H_2O$ | Hydrolysis Temperature, °C. | Time of Hydrolysis | Distillation Press., mm. | Per cent Yield Acrylic Acid | Per cent Acrylic Acid in Distillate |
|---|---|---|---|---|---|---|---|---|
|  |  |  |  |  | Hours |  |  |  |
| 38 | 1 | 1.25 | 2 | 120 | 3 | 12–15 | 84.2 | 69.8 |
| 39 | 1 | 1.65 | 2 | 120 | 4 | 12–15 | 86.8 | 75.5 |
| 40 | 1 | 1.75 | 2 | 120 | 4 | 12–15 | 91.2 | 76.5 |
| 41 | 1 | 2 | 2 | 120 | 4 | 12–15 | 93.3 | 79.0 |

The influence of distillation pressure on the yield of acrylic acid is illustrated by the examples listed in Table 5.

Table 5

| Examples | Mols ECH | Mols H₂SO₄ | Mols H₂O | Hydrolysis Temperature, °C. | Time of Hydrolysis | Distillation Press., mm. | Per cent Yield Acrylic Acid | Per cent Acrylic Acid in Distillate |
|---|---|---|---|---|---|---|---|---|
| | | | | | Minutes | | | |
| 42 | 1 | 2 | 2 | 155 | 15 | 3 | 94.2 | 77.4 |
| 43 | 1 | 2 | 2 | 155 | 15 | 12 | 91.2 | 76.9 |
| 44 | 1 | 2 | 2 | 155 | 10 | 25 | 90.0 | 76.5 |
| 45 | 1 | 2 | 2 | 155 | 15 | 50 | 89.6 | 77.3 |
| 46 | 1 | 2 | 2 | 155 | 15 | 100 | 89.6 | 79.7 |
| 47 | 1 | 2 | 2 | 155 | 15 | 180 | 88.5 | 79.7 |
| 48 | 1 | 2 | 2 | 155 | 15 | 760 | 71.0 | 77.0 |
| 49 | 1 | 2 | 3 | 155 | 15 | 3 | 100.0 | 64.2 |
| 50 | 1 | 2 | 3 | 155 | 15 | 13 | 94.8 | 63.6 |
| 51 | 1 | 2 | 3 | 155 | 15 | 50 | 96.7 | 67.2 |
| 52 | 1 | 2 | 3 | 155 | 15 | 100 | 96.9 | 68.4 |
| 53 | 1 | 2 | 3 | 155 | 15 | 100 | 93.6 | 65.8 |
| 54 | 1 | 2 | 3 | 155 | 15 | 180 | 95.8 | 69.0 |
| 55 | 1 | 2 | 3 | distilled directly | | 760 | 84.0 | 69.8 |
| 56 | 1 | 2 | 4 | distilled directly | | 760 | 89.0 | 61.3 |

*Example 57.*—Eighteen grams (1.0 mol) of water and 0.5 g. of copper powder (antipolymerizing agent) were added to 268.5 g. of the reaction product of one mol of ethylene cyanohydrin and two mols of 100% sulfuric acid. The mixture was stirred and heated to 120° C. The heat released by hydrolysis at first caused the temperature to rise somewhat above 120° C. At the end of four hours the mixture was subjected to a pressure of 12–15 mm. and the temperature was raised ultimately to about 195° C. The distillate weighed 61.0 g. Titration indicated a 76.0% yield of acrylic acid (based on the ethylene cyanohydrin used), in a strength of 89.6%.

*Example 58.*—Use of the same procedure as that described in Example 57 except that 36 g. (2.0 mols) of water were employed, gave 85.5 g. of distillate. The yield of acrylic acid was 91.6%, the strength of the distillate being 77.1%.

*Example 59.*—Use of the procedure described in Example 57 except that 54 g. (3.0 mols) of water were used, gave 102.2 g. of distillate. The yield of acrylic acid was 93.2% of the theoretical, the strength of the distillate being 65.6%.

*Example 60.*—Fifty-four grams (3.0 mols) of water and 0.5 g. of copper powder were added to 268.5 g. of the reaction product of one mol of ethylene cyanohydrin and two mols of 100% sulfuric acid. The mixture was then heated rapidly to 150–155° C. and held at this temperature, while being stirred, for fifteen minutes. At the end of this period the pressure was reduced to 13 mm. and the temperature was raised, ultimately to 195° C. The distillate weighed 107.2 g. The yield of acrylic acid was 94.8% of the theoretical, the strength of the distillate being 63.6%.

The improved method herein described for the production of acrylic acid possesses many advantages which will be apparent to those skilled in the art. The conversion of ethylene cyanohydrin to β-sulfatopropionamide, the hydrolysis of the amide and the cracking of the hydrolyzed product are smooth, readily controlled reactions. The method is simple and easily operated, and the desired acid is obtained in high yields.

While the invention has been described with particular reference to specific embodiments, it is to be understood that it is not to be limited thereto but is to be construed broadly and restricted solely by the scope of the appended claims.

We claim:

1. A method of preparing acrylic acid which includes the steps of reacting ethylene cyanohydrin with anhydrous sulfuric acid to produce β-sulfatopropionamide, adding water thereto, heating the mixture at a temperature sufficient to form acrylic acid and ammonium bisulfate, and recovering the acrylic acid therefrom.

2. Method of claim 1 wherein the ethylene cyanohydrin and at least one molecular proportion of anhydrous sulfuric acid are brought together to produce β-sulfatopropionamide.

3. Method of claim 1 wherein the ethylene cyanohydrin is reacted with anhydrous sulfuric acid at a temperature not exceeding about 100° C.

4. A method of preparing acrylic acid which includes the steps of reacting ethylene cyanohydrin with anhydrous sulfuric acid at a temperature within the range of 40°–90° C. to produce β-sulfatopropionamide, adding water thereto, heating the mixture at a temperature sufficient to form acrylic acid and ammonium bisulfate, and recovering the acrylic acid therefrom.

5. A method of preparing acrylic acid which includes the steps of reacting ethylene cyanohydrin with anhydrous sulfuric acid at a temperature within the range of 40°–90° C. to produce β-sulfatopropionamide, adding water thereto, heating the mixture under a pressure less than atmospheric pressure at a temperature sufficient to form acrylic acid and ammonium bisulfate, and recovering the acrylic acid therefrom.

6. A method of preparing acrylic acid which includes the steps of reacting ethylene cyanohydrin with anhydrous sulfuric acid at a temperature within the range of 40°–90° C. to produce β-sulfatopropionamide, adding water thereto, heating the mixture under a pressure less than atmospheric pressure at a temperature sufficient to form acrylic acid and ammonium bisulfate, and distilling the acrylic acid therefrom.

7. A method of preparing acrylic acid which includes the steps of heating a mixture comprising β-sulfatopropionamide and water at a temperature sufficient to form acrylic acid and ammonium bisulfate, and recovering the acrylic acid therefrom.

8. A method of preparing acrylic acid which includes the steps of heating a mixture comprising β-sulfatopropionamide and water under a pressure less than atmospheric pressure at a temperature sufficient to form acrylic acid and ammonium bisulfate, and distilling the acrylic acid therefrom.

9. β-sulfatopropionamide.

10. A method of preparing β-sulfatopropionamide which includes the step of reacting ethylene cyanohydrin with anhydrous sulfuric acid.

11. The method of claim 10 in which the ethylene cyanohydrin and anhydrous sulfuric acid are reacted in molecular proportions.

12. The method of claim 10 in which the reaction takes place at temperatures less than 100° C.

13. The method of claim 10 in which the reaction takes place at a temperature within the range of 40°–90° C.

HAROLD S. DAVIS.
    MYRL LICHTENWALTER.
    JOHN G. ERICKSON.

REFERENCES CITED

The following references are of record in the file of this patent:

UNITED STATES PATENTS

| Number | Name | Date |
| --- | --- | --- |
| 2,255,082 | Orthner et al. | Sept. 9, 1941 |
| 1,581,621 | Trusler | Apr. 20, 1926 |
| 2,265,814 | Ritchie et al. | Dec. 9, 1941 |
| 2,026,894 | Hill | Jan. 7, 1936 |
| 2,140,469 | Crawford et al. | Dec. 13, 1938 |

FOREIGN PATENTS

| Number | Country | Date |
| --- | --- | --- |
| 633,334 | Germany | July 24, 1936 |
| 640,581 | Germany | Jan. 7, 1937 |